United States Patent [19]

Lindsey et al.

[11] Patent Number: 5,070,745
[45] Date of Patent: Dec. 10, 1991

[54] ASYMMETRICAL DIFFERENTIAL DRIVE

[76] Inventors: Kelly D. Lindsey, 4513 51st Street, Drayton Valley, Alberta, Canada, T0E 0M0; Robert J. Holan, 9324 83rd Street, Edmonton, Alberta, Canada, T6C 2Z7

[21] Appl. No.: 633,272

[22] Filed: Dec. 24, 1990

[51] Int. Cl.$^5$ .............................................. F16H 37/06
[52] U.S. Cl. ................................ 74/665 GB; 74/424; 74/417
[58] Field of Search .............. 74/665 GB, 665 T, 417, 74/424

[56] References Cited

U.S. PATENT DOCUMENTS

| | | | |
|---|---|---|---|
| 2,335,080 | 11/1943 | Piron | 74/424 |
| 3,926,065 | 12/1975 | Summers et al. | 74/424 |
| 4,601,359 | 7/1986 | Weismann et al. | 74/665 GB X |
| 4,637,276 | 1/1987 | Holan et al. | 74/424 X |
| 4,643,284 | 2/1987 | Hardt et al. | 74/665 GB X |
| 4,721,010 | 1/1988 | Sheldon et al. | 74/665 T X |
| 4,815,338 | 3/1989 | Holan et al. | 74/417 X |

Primary Examiner—Dirk Wright
Attorney, Agent, or Firm—William L. Chapin

[57] ABSTRACT

A differential for motor vehicles uses a pinion gear attached to a drive shaft to drive a single ring gear attached to a first axle half shaft positioned at right angles to the drive shaft. The axle half shaft is simultaneously fastened to, and coaxially aligned with, the ring gear by means of a disc-shaped centering hub having external splines which simultaneously mesh with adjacent, internally splined cylindrical inner surfaces of the ring gear and a disc-shaped backing plate. Internal splines projecting inward from the inner cylindrical surface of a central coaxial hole through the centering hub mesh with external splines on the cylindrical surface of the axle half shaft.

In one embodiment, a second opposing axle half shaft is allowed to free-wheel within the differential case. In a second embodiment, the opposing axle half shaft is slippably driven by the first axle half shaft by means of a clutch coupling the first and second axle half shafts. In a third embodiment, first and second axle half shafts are rigidly coupled to one another.

15 Claims, 3 Drawing Sheets

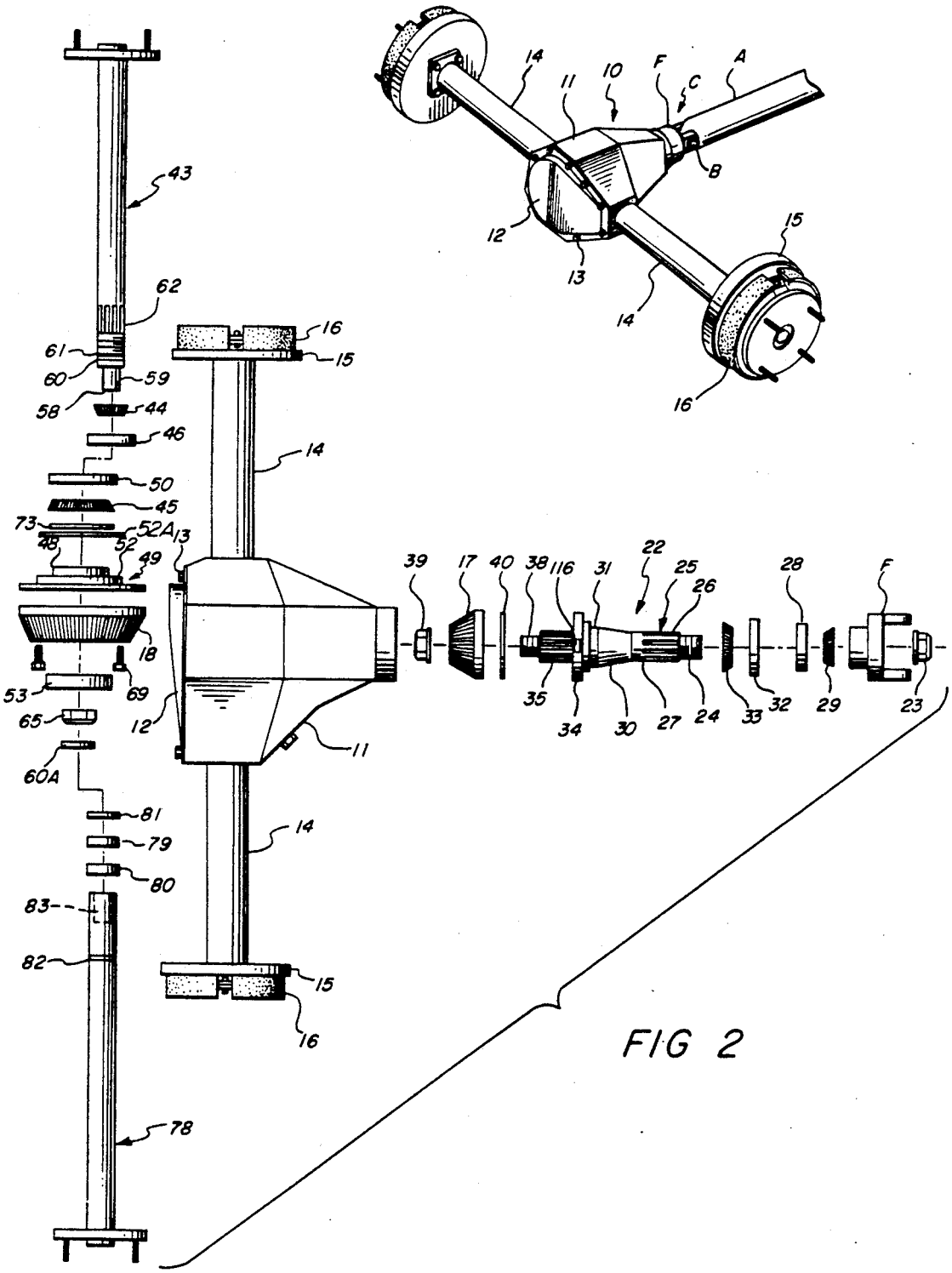

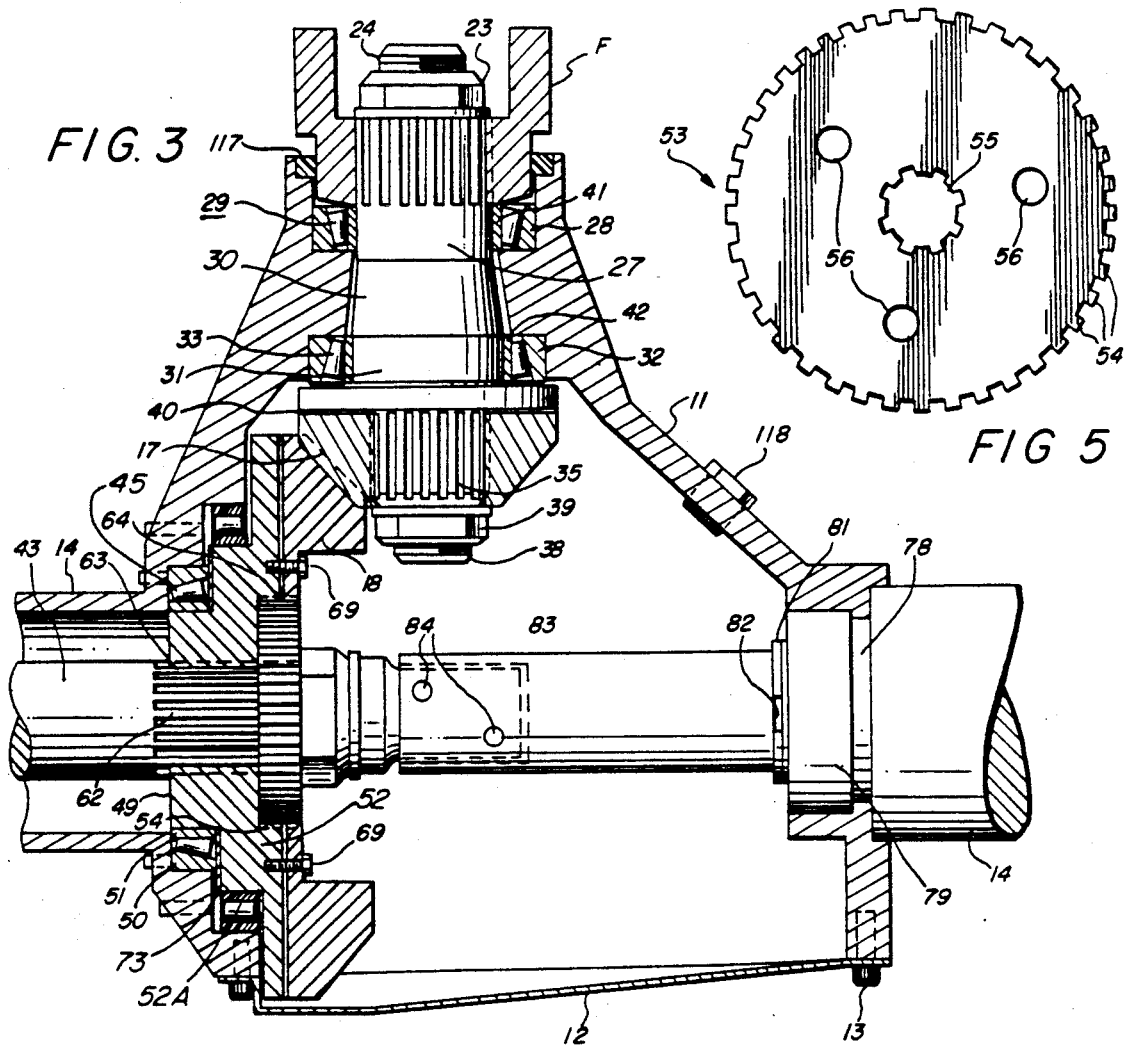
FIG. 3
FIG 5
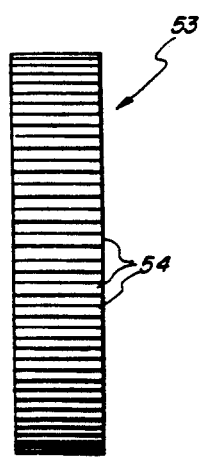
FIG. 6
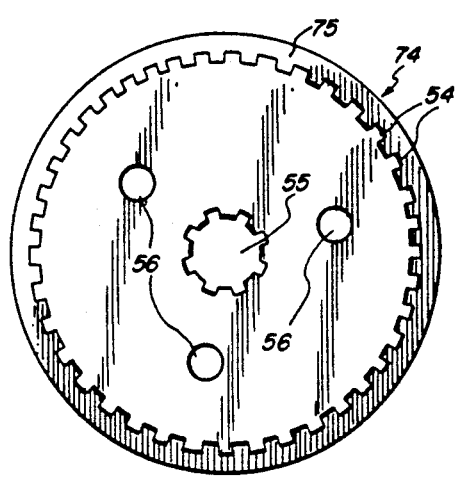
FIG 7
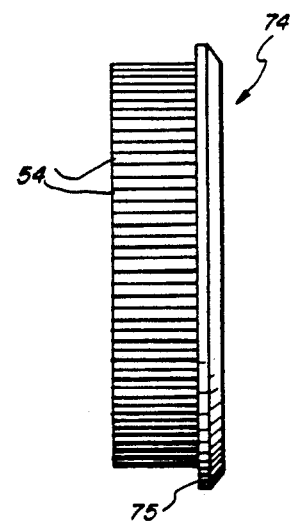
FIG. 8

ASYMMETRICAL DIFFERENTIAL DRIVE

FIELD OF THE INVENTION

This invention relates to differential assemblies for use in motor vehicles. More particularly, it relates to differential assemblies having an input drive shaft coupling and two colinear, opposed half axles extending perpendicularly outward from the input drive shaft axis.

DESCRIPTION OF THE PRIOR ACT

Conventional vehicle differentials generally employ an input pinion gear coupled to the end of an input drive shaft which is rotated by the vehicle engine. In the conventional differential, the input pinion gear drives a crown or ring gear whose rotation axis is perpendicular to the rotation axis of the input pinion gear. The crown or ring gear is rotably mounted coaxially over the inner end of one half axle. One wheel of the vehicle is mounted to the outer end of the half axle. A second wheel and half axle are mounted at the opposite side of the vehicle.

A box-like structure referred to as the differential housing or carrier is mounted rigidly to the inner side of the crown or ring gear. The inner ends of both half axles extend inward through openings on opposite sides of the carrier, and are rotatably supported there within. Rigidly mounted to the ends of both half axles within the carrier are side bevel gears which face inward. The side gears are similar in appearance to the crown or ring gear, but smaller in diameter. Meshing at right angles with the pair of side gears are two opposed pairs of inwardly facing differential pinion gears which are rotatably mounted to the carrier. The axes of the two opposed pairs of differential pinion gears are perpendicular to one another and to the common axis of the half axles.

When a vehicle with a conventional differential as just described travels in a straight line, the crown or ring gear, differential carrier, side gears and attached half axles all rotate at the same angular velocity In that situation, the differential pinion gears do not rotate around their own axes.

However, when the vehicle turns, the axle half shaft attached to the outward wheel turns faster than the axle half shaft attached to the inboard wheel. The accompanying relative rotational motion of the half shafts with respect to one another is permitted by the rotation of the differential side gears with respect to one another, and with respect to the differential carrier. This imparts a corresponding, opposed rotation couple to each pair of opposed differential pinions about their own axes. The rotation of coaxial differential pinion gears pairs relative to one another permits the two side bevel gears which mesh with the differential pinion gears and which are rigidly connected to the two axle half shafts to rotate with different speeds required for inboard and outboard wheels.

Our U.S. Pat. No. 4,637,276, Jan. 20, 1987, *Single Gear-Pair Vehicle Differential*, disclosed a single-gear pair differential having fewer gears than prior existing designs, and therefore makes possible a differential having lower weight and cost. That differential was primarily useful for applications in which the input shaft speed was less than the output shaft speed.

OBJECTS OF THE INVENTION

An object of the present invention is to provide a differential for use in vehicles which has fewer gears than existing designs.

Another object of the present invention is to provide a simplified vehicle differential which has a ratio of input to output speeds of greater than one, thereby providing higher torque at the output shafts than available at the input shaft.

Another object of the present invention is to provide a vehicle differential which may be readily modified to a locked axle configuration.

Another object of the invention is to provide a vehicle differential providing limited relative rotation rates between output axle half shafts of the differential.

Another object of the invention is to provide a vehicle differential which is easy to assemble, align, disassemble and maintain.

Various other objects and advantages of the present invention, and its most novel features, will become apparent to those skilled in the art by a reading of the accompanying specification and claims.

It is to be understood that although the invention disclosed here in fully capable of achieving the objects and providing the advantages mentioned, the structural and operational characteristics of the invention described herein are merely illustrative of the preferred embodiments. Accordingly, we do not intend the scope of our exclusive rights and privileges in the invention to be limited to the details of construction described. We do intend that reasonable equivalents, adaptations and modifications of the various embodiments and modifications of the present invention which are described herein be included within the scope of the invention as defined by the appended claims.

SUMMARY OF THE INVENTION

A vehicle differential according to the present invention includes a pinion gear fastened coaxially to the inner end on input drive shaft. No differential carrier, differential pinion gears or differential side gears are used in the present invention. Instead, a first axle half shaft is rotatably mounted through an opening in one side of a differential case enclosing internal components of the differential. The first axle half shaft is rotatably driven by a single crown or ring gear fastened coaxially to the inner end of the shaft. The input shaft pinion gear has a smaller diameter than the output ring gear fastened to the first half axle, and meshes at right angles with the ring gear. Thus, the first axle half shaft, which is disposed perpendicularly to the input drive shaft, is rotatably driven by and at a lower rotation rate than the input drive shaft. Included in the differential according to the present invention is a second axle half shaft colinear with the first axle half shaft, and rotatably mounted through an opening in the opposite side of the differential case.

In one embodiment of the invention, the second axle half shaft is allowed to rotate freely, or "free-wheel" within the differential case. In a second embodiment of the invention, the second axle half shaft is slippably driven by the first axle half shaft by means of a slip clutch coupling the inner ends of the first and second axle half shafts. In a third embodiment of the invention, the inner ends of the first and second axle half shaft are rigidly coupled together, allowing no relative rotation between first and second axle half shafts.

BRIEF DESCRIPTION OF THE DRAWINGS

FIG. 1 is an upper perspective view of the differential according to the present invention, showing its conventional placement relative to the longitudinally disposed drive shaft of a wheeled vehicle.

FIG. 2 is an exploded top plan view of the differential according to the present invention.

FIG. 3 a fragmentary, partially sectional top plan view of the differential of FIG. 2.

FIG. 5 is a front elevation view of a centering hub which is part of the differential shown in FIGS. 1 through 4.

FIG. 6 is a side elevation view of the centering hub shown in FIG. 5.

FIG. 7 is a rear elevation view of a second, alternate type of centering hub for use in the differential of FIG. 2.

FIG. 8 is a side elevation view of the alternate type of centering hub shown in FIG. 7.

DESCRIPTION OF THE PREFERRED EMBODIMENTS

Figure 4:
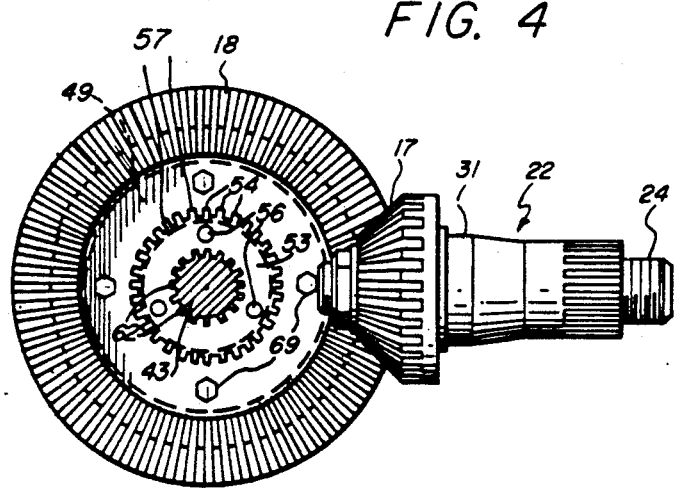
FIG. 4 is a fragmentary, partially sectional side elevation view of the differential of FIG. 2, taken along line 4—4 of FIG. 3.

Referring now to FIGS. 1 and 2, a vehicle differential constructed in accordance with the present invention is shown. A bulbous metal shell 11 forms the greater portion of the differential case enclosing the internal components of the differential. A more generally flat, dish-shaped rear cover plate 12 encloses the back portion of the differential and is secured to shell 11 by bolts 13.

Tubular axle housing cylinders 14 extend outwardly from either side of differential case shell 11, and are rigidly fastened thereto. Wheel backing plates 15 and brake shoes 16 are shown fastened to the outer ends of each axle housing cylinder 14.

As may be seen best in FIG. 3, input pinion gear 17 meshes at right angles with output crown or ring gear 18. Thus, when rotational input power is applied around the axis of pinion gear 17, a torque is exerted on ring gear 18. Ring gear 18 is thus enabled to exert an output torque around its axis, which is perpendicular to the axis of input pinion gear 17.

Input pinion gear 17 is driven by a conventional longitudinal drive shaft A as, will now be described. Referring now to FIGS. 1 and 2, drive shaft A, which is not part of the present invention, is coupled to input yoke B of universal joint C. Input yoke B of universal joint C is pivotably coupled to two input cross bars D of spider E of the universal joint. The output, or rear yoke F of universal joint C is pivotably coupled to two output cross bars G of spider E, which are disposed perpendicularly to input cross bars D of spider E. Rear yoke F is fastened to differential input shaft 22 by means of pinion yoke nut 23 tightened down on external threads 24 on the forward end of the input shaft.

As may be seen best in FIG. 2, differential input shaft 22 is an elongated member having circular cross sections of various diameters. A front intermediate portion 25 of input shaft 22 extending some distance back from threads 24 has a uniform outer diameter, and contains external splines 26 adapted to being slid into internal splines H in yoke F.

Rearward of front intermediate portion 25 of input shaft 22 is a smooth, uniform diameter region 27. Region 27 comprises a front bearing race mounting surface adapted to fitting tightly within inner bearing race 41 of front input shaft roller bearing 29.

Rearward of front bearing race mounting surface 27, input shaft 22 has a center portion 30 which tapers outward and rearward to a larger diameter, rear bearing race mounting surface 31. Rear bearing race mounting surface 31 is adapted to form an interference fit within inner bearing race 42 of rear input shaft roller bearing 33.

Behind rear bearing race mounting surface 31, input shaft 22 has a relatively large diameter circular cross-section flange 34. Rearward of flange 34, input shaft 22 has a uniform smaller outer diameter section with external splines 35. Splines 35 are adapted to being slid into internal splines 36 in pinion gear 17. The rearmost portion of input shaft 22 has external threads 38.

Pinion gear 17 is fastened to input shaft 22 by tightening pinion gear nut 39 onto threads 38, forcing pinion gear 17 towards pinion gear backing flange 34. Annular-shaped pinion gear shim 40 slid over splines 35 is positioned between the rear surface of flange 34 and front surface of pinion gear 17, thereby controlling the distance which the pinion gear extends backwards from the flange. Thus, as will become apparent later, pinion gear shim 40 controls the amount of mesh with the gear which pinion gear 17 drives.

To facilitate disassembly of pinion gear 17 from input shaft 22, two diametrically opposed slots 116 are milled into the outer annular surface of flange 34. Slots 116 are adapted to receive the tongs of a standard gear puller.

As may be seen best in FIG. 3, pinion gear 17 faces rearward into the interior of differential case 11, and meshes with crown or ring gear 18. Pinion gear shaft 22 extends longitudinally rearward through an opening near the front of differential case 11. Shaft 22 is supported within differential case 11 and maintained in a fixed longitudinal position relative to ring gear 18 by means of opposed, tapered roller bearings 29 and 33.

Front tapered roller bearing 29 rotates between outer bearing race 28, which fits tightly within an annular opening near the front of differential case 11, and inner race 41, which fits tightly onto surface 27 on input shaft 22. Rear tapered roller bearing 33 rotates between outer race 32, which fits tightly in an annular opening back from the front of differential case 11, and inner race 42, which fits tightly onto surface 31 of input shaft 22.

As may be seen best in FIG. 2, left half axle 43 is disposed coaxially within left tubular axle housing 14. As shown in FIGS. 2 and 3, the inner end of left half axle 43 extends transversely inward through an opening on the left side of differential case 11, coaxially within left tubular axle housing 14. Left half axle 43 is supported within differential case 11 and maintained in a fixed lateral position relative to pinion gear 17 by means of opposed, tapered roller bearings 44 and 45.

Outer tapered roller bearing 44 rotates between outer bearing race 46, which fits tightly within an annular opening near the outer left side of tubular axle housing 14. Flanged ring gear mounting plate 49 is fastened to left half axle in a manner to be described below.

Inner tapered roller bearing 45, which is positioned closer towards the center of differential case 11. Inner tapered roller bearing 45 rotates between outer bearing race 50, which fits tightly within an annular opening inward from the outer left side of differential case 11, and inner bearing race 51. Inner bearing race 51 fits tightly onto the outer circumferential surface of outer flange 48 of flanged ring gear backing plate 49. A needle roller bearing assembly 52A fits over intermediate flange 52 of flanged ring gear backing plate 49, and coaxially within an annular opening in differential case 11. The needle roller bearing assembly 52A helps to keep backing plate 49 and attached ring gear 18 from "walking out" from differential case 11. Needle roller assembly 52A keeps backing plate 49 from cocking, while tapered roller bearing 45 centers the backing plate and limits its lateral movement.

Ring gear backing plate 49 is used to provide a flat mounting surface for the flat rear or outer side of ring gear 18. Backing plate 49 and ring gear 18 are fastened to left half axle 43 by means of centering hub 53, as will now be described.

Referring now to FIGS. 2, 3 and 4, and also to FIGS. 5 and 6, a generally flat, round disc-shaped centering hub 53 is shown. The outer circumferential surface of centering hub 53 contains a plurality of uniformly spaced external splines 54. The inner circumferential surface of a central coaxial hole through the flat portion of centering hub 53 contains a plurality of uniformly spaced internal splines 55. Three threaded holes 56 disposed at 120 degree intervals on a circle concentric with and intermediate between the surfaces of external splines 54 and internal splines 55 extend perpendicularly through the thickness dimension of centering hub 53. Threaded holes 56 are used to disassemble centering hub 53 from ring gear 18 and flanged ring gear backing plate 49 in a manner to be described below.

As shown in FIGS. 3 and 4, ring gear 18 has a hole passing through its flat portion, coaxial with the rotational center line of ring gear 18. The central hole in ring gear 18 contains a plurality of uniformly spaced internal splines 57. Internal splines 57 are adapted to mesh with external splines 54 of centering hub 53.

As shown in FIGS. 2, 3 and 4, left half axle 43 has a substantially uniform diameter over most of its length. However, the inner end 58 of left half axle 43 is constricted to a smaller, uniform diameter section 59 extending a short distance from the inner transverse face of the half axle. The larger, uniform diameter region of left half axle 43 just rearward of the rear end of constricted diameter section 59 contains an annular groove 60 adapted to receive a snap ring 60A. The outer circumferential surface of left half axle 43 also contains helical threads 61 extending some distance rearward from annular groove 60. Finally, the outer circumferential surface of a portion of left half axle 43 rearward of threads 61 contains a plurality of uniformly spaced, longitudinally disposed external splines 62.

Ring gear 18, flanged ring gear backing plate 49 and left half axle 43 are joined together by the use of centering hub 53 in the following manner. First, inner end 58 of left half axle 43 is inserted through a clearance hole 63 in the outer flange 48 of flanged ring gear backing plate 49. External splines 62 on left half axle 43 are then aligned with internal splines 55 of centering hub 53. Also, external splines 54 of centering hub 53 are aligned with internal splines 57 in ring gear 18, and with internal splines 64 in flanged ring gear backing plate 49. Ring gear axle nut 65 is then tightened down on threads 61 on the inner end 58 of left half axle 43. The thrust pressure exerted on the inner face of centering hub 53 then forces external splines 62 in left half axle 43 to slide inward of internal splines 55 of centering hub 53. Simultaneously, the thrust pressure exerted on the inner face of centering hub 53 forces external splines 54 to slide inwards of both internal splines 57 in ring gear 18, and inwards of internal splines 64 in flanged ring gear backing plate 49. Ring gear axle nut 65 is tightened until the outer transverse face 66 of centering hub 53 is pressed tightly against bottom face 67 of a blind, counter bore hole 68 provided in the inner transverse face of flanged ring gear backing plate 49.

The use of centering hub 53 thus provides a novel and efficient means for simultaneously assembling together and concentrically aligning left half axle 43, ring gear backing plate 49 and ring gear 18.

Bolts 69 inserted through clearance holes 70 in ring gear 18 are tightened into threaded holes 71 in the inner face of flanged ring gear backing plate 49 to secure ring gear 18 in a fixed longitudinal position relative to left half axle 43 and pinion gear 17. Thus bolts 69 transmit torque from ring gear 18 through backing plate 49 to left half axle 43.

However, the predominant mode of torque transmittal from ring gear 18 to left half axle 43 is by means first of internal splines 57 in ring gear 18 to external splines 54 on centering hub 53, and then from internal splines 55 in centering hub 53 to external splines 62 on left half axle 43. Accordingly, a minimum number of ring gear bolts 69 is required to secure ring gear 18, the primary function of bolts 69 being to secure ring gear 18 in a fixed longitudinal position. The longitudinal position of ring gear 18 relative to pinion gear 17 is adjusted by selecting the desired thickness of annular ring gear shim 73, which is placed on the outer transverse face of intermediate diameter flange 52 of flanged ring gear backing plate 49, between inner tapered roller bearing races 45 and needle bearing assembly 52A. Alternatively, the longitudinal position of ring gear 18 could be adjusted by a shim placed between the flat outer transverse surface of the ring gear, and the flat inner transverse surface of flanged ring gear mounting plate 49.

To disassemble ring gear 18 from left half axle 43, ring gear bolts 69 are first removed. Then gear puller bolts are screwed into holes 56 in centering hub 53, and tightened uniformly against the bottom face 67 of hole blind 68 in flanged ring gear backing plate 49. As the gear puller bolts are tightened further, an outward axial thrust force is exerted on centering hub 53, withdrawing the centering hub from engagement with both ring gear backing plate 49 and left half axle 43.

FIGS. 7 and 8 illustrate an alternate embodiment 74 of the centering hub 53 shown in FIGS. 5 and 6. Alternate centering hub 74 has an inner annular flange 75. The flat outer face of flange 75 is adapted to abut the bottom annular face 76 of a blind counterbored hole 77 provided in ring gear 18, when centering hub 74 is assembled to ring gear 18, ring gear backing plate 49 and left half axle 43 in a manner exactly the same as described above for assembling centering hub 53. Flange 75 thus prevents outward axial movement of ring gear 18 when tightened onto it, dispensing with the need for ring gear bolts 69.

As may be seen best in FIG. 3, right half axle 78 is rotatably supported through an opening in the right side of differential case 11 by inner roller bearing 79. The outer end of right half axle 78 is supported within tubular axle housing 14 by outer roller bearing 80, FIG. 2. Inner roller bearing 79 and right half axle 78 are secured in differential case 11 by retaining snap ring 81 inserted into annular groove 82 in the inner end of right half axle 78.

In the basic embodiment of the invention, a cylindrical cavity 83 coaxial with the longitudinal axis of right half axle 78 extends back some distance from the inner face of the right half axle. Cavity 83 is of sufficient diameter to permit inner end 59 of left half axle 43 to rotate within the cavity without contacting right half axle 78. Alternatively, an annular bearing may be positioned between inner end 59 and cavity 83. Holes 84 through the wall of cylindrical end cavity 83 permit lubricant contained within differential housing 11 to pass into the region between inner end 59 and cavity 83. Thus, in the basic embodiment of the invention, one half axle (the left half axle 43 in this example) is driven, while the other half axle (the right half axle 78 in this example) is permitted to free wheel. Therefore, when a vehicle equipped with a differential according to the present invention executes a left turning motion right half axle 78 and the wheel attached to its outer end are free to rotate at the larger rotation speed required for an outboard wheel. Conversely, when the vehicle executes a right turning motion, the right half axle and wheel are free to rotate at the smaller rotation speed required for an inboard wheel.

Figure 9:
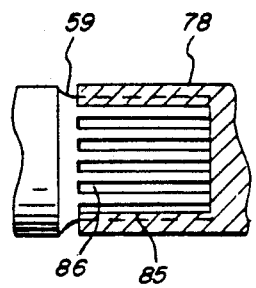
FIG. 9 is a fragmentary, partially sectional rear elevation view of a second embodiment of the differential according to the present invention.

An alternate embodiment of the invention generally in conformance with the structure illustrated in FIGS. 1 through 4 is shown in FIG. 9. In the alternate embodiment shown in FIG. 9, the interior of cylindrical end cavity 83 of right half axle 78 is provided with internal splines 85. End 59 of left half axle 43 is provided with external splines 86 which permit end 59 to slide freely into cavity 83 during assembly of the differential. However, splines 85 and 86 mesh with one another to prevent relative rotation of left half axle 43 and right half axle 78. Thus, in this embodiment, left rear half axle 43 and right half axle 78 are rigidly locked together and constrained to turn at the same rotation speeds. This locked rear axle configuration is useful for such applications as drag racing.

Figure 10:
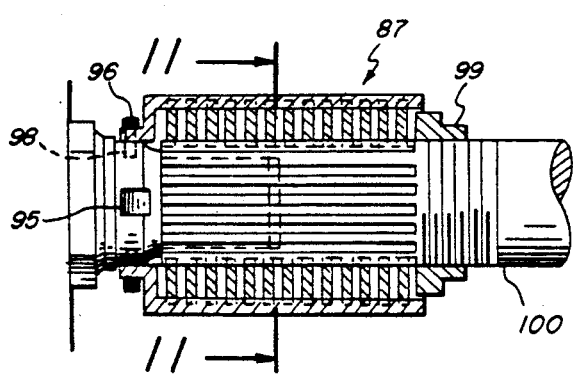
FIG. 10 is a fragmentary, partially sectional rear elevation view of a third embodiment of the differential according to the present invention.
Figure 11:
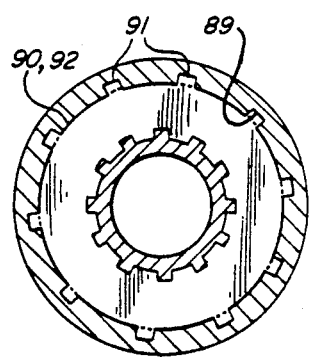
FIG. 11 is a sectional side elevation view of a portion of the apparatus of FIG. 10, taken along line 11—11 of FIG. 10.
Figure 12:
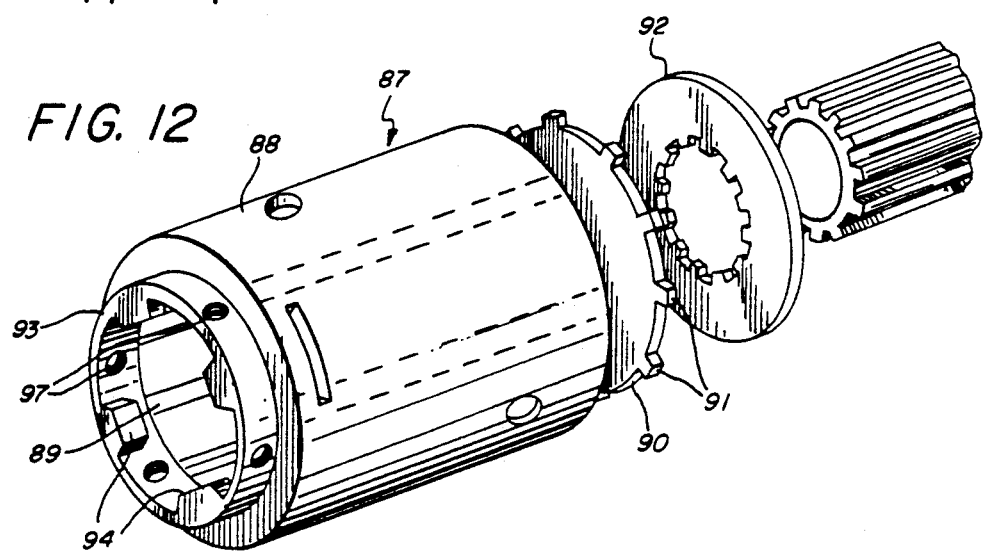
FIG. 12 is an exploded view of the clutch disc and plate assembly of FIGS. 10 and 11.

In a third embodiment of the invention, shown in FIG. 10, 11 and 12, a slip clutch 87 is used to slippably couple rotary motion from the left half axle to the right half axle.

As shown in FIG. 10 and 11, the inner end of right half axle 78 is modified from the left half axle used in the basic embodiment of the invention by the addition of a hollow cylindrical clutch housing 88 fastened to the inner end of left half axle 43 just inboard of the point where the left half axle protrudes into the interior of differential case 11. Clutch housing 88 is coaxial with the longitudinal axis of left half axle 43, and extends inward some distance towards the center of differential case 11. The inner cylindrical wall of clutch housing 88 contains a plurality of rectangular cross-section, elongated slots 89 disposed longitudinally parallel to the longitudinal, cylindrical axis of clutch housing 88. Slots 89 are positioned at regular angular intervals around the cylindrical axis of clutch housing 88.

A plurality of identical uniformly spaced clutch driving plates in the shape of annular rings 90 with radially projecting tabs 91 are held captive within slots 89 of clutch housing 88, as will be described below. Clutch driving plates 90 are disposed in parallel alignment along and perpendicular to the longitudinal axis of clutch housing 88. Clutch driving plates 90 are preferably fabricated from thin, uniform cross section metal sheet stock.

Each clutch driving plate 90 is provided with a plurality of integral rectangular tabs 91 which extend radially outward from the outer circumferential edge of each plate. Tabs 91 protrude into corresponding slots 89 in clutch housing 88, thereby adapting driving plates 90 to be driven rotationally by clutch housing 88.

Clutch driving plates 90 are adapted to slippably drive clutch friction plates 92, as will be described below. As shown in FIGS. 10, 11 and 12, clutch friction plates 92 are flat, annular shaped discs which are internally splined. Friction plates 92 are disposed along the externally splined inner end of right half axle 78, between pairs of clutch driving plates 90. The mesh between the externally splined surface of right half axle 78 and internally splined surfaces of clutch friction plates 92 forces right half axle 78 to rotate at the same rate as friction plates 92, provided no external torque is exerted on right half axle 78.

The left or inner end of clutch housing 88 has an integral cup-shaped member 93 coaxial with the longitudinal axis of the housing, and extending outward therefrom. An outward facing opening in cup-shaped member 93 is slid over end 59 of left half axle 43 during assembly of the differential. Cup-shaped member 93 is secured rotationally to end 59 of left half axle 43 by means of lugs 94 projecting radially inward from the inner cylindrical surface of member 93 meshing with corresponding slots 95 in the cylindrical surface of left half axle end 59, as shown in FIG. 10. Cup-shaped member 93 and attached clutch housing 88 are secured to left half axle 43 by a plurality of countersunk Allen screws 96 screwed through holes 97 in cup-shaped member 93 and holes 98 in left half axle 43.

Clutch friction plates 92 are enabled to be frictionally driven by clutch driver plates 90 by tightening internally threaded clutch adjusting collar 99 over threaded portion 100 of right half axle 78 down onto the outermost clutch driver plate 90. Facing surfaces of clutch friction plates 92 and clutch driver plates 90 are laminated with thin sheets of paper or similar material which provides a relatively high coefficient of friction. The pressure applied to outermost clutch driver plate 90 forces mating surfaces of clutch driver plates 90 and clutch friction plates 92 to frictionally contact one another. Thus, when left half axle 43 is rotatably driven, clutch housing 88, which is rigidly fastened to inner end 59 of left half axle 43 also rotates. This causes clutch driver plates 90, which are rigidly attached to the interior of the clutch housing to rotate at the same speed. The pressure produced on the mating surfaces of clutch driver plates 90 and clutch friction plates 92 by clutch collar 99 causes friction plates 92 to rotate at the same speed as driver plates 90. Also, the engagement of splines of friction plates 92 in slots of right half axle 78 causes the right half axle to rotate along with friction plates 92, and hence at the same speed as left half axle 43. Accordingly, when a vehicle equipped with a differential according to this embodiment of the present invention travels in a straight line, both left and rear half axles turn at the same speed, and vehicle locomotion power is applied to both left and rear half axles. When the vehicle executes a right turn, left half axle 43 must rotate faster than right half axle 78, since the outboard wheel of the vehicle and hence the half axle attached to it must rotate faster than the inboard wheel and axle. Slippage between clutch driving plates 90 and clutch friction plates 92 allows left half axle 43 and driving plates 90 to rotate faster than driven friction plates 92 and right half axle 78. Conversely, when the vehicle executes a left turning motion, the left half axle and wheel and clutch driving plates 90 are permitted to rotate at a slower rate than right half axle 78 and driven friction plates 92, owing to the slippage between clutch driving plates 90 and driven friction plates 92.

What is claimed is:

1. An apparatus for transforming rotary power conveyable into said apparatus by a drive shaft to rotary traction power to at least two wheels of a vehicle comprising:
   (a) a pinion gear adapted to being rigidly coupled to an input power drive shaft,
   (b) a ring gear having longitudinally disposed teeth adapted to mesh with teeth of said ring gear, and an internally splined central hole,
   (c) a first half axle rigidly coupled to said ring gear,
   (d) a second half axle colinear with said first half axle,
   (e) means for rotatably supporting said ring gear and said first and second half axles,
   (f) a disc-shaped backing plate having a generally flat front face for supporting the back face of said gear, said backing plate having a longitudinally disposed central hole passing through the thickness dimension of said backing plate, said hole providing clearance for said axle, and said backing plate having a large diameter, internally splined blind cavity extending coaxially inwards from the front face of said backing plate,
   (g) a generally disc-shaped centering hub having longitudinally disposed external splines of the proper size to mesh with said splines of said internally splined blind cavity of said backing plate, and simultaneously to mesh with said internal splines of said gear, said centering hub having a coaxial central hole passing through the thickness dimension of said disc, said hole having internal splines adapted to mesh with longitudinally disposed external splines on the outer cylindrical surface of said axle, and
   (h) means for securing said centering hub, said gear, said backing plate and said axle together, said means being effective in securing said external splines on said centering hub into mutual meshing engagement with said internal splines on said gear and said backing plate, and said means being effective in securing said external splines on said axle into meshing engagement with said internal splines in said central hole of said centering hub, thereby coaxially aligning and securing to one another said axle, said gear backing plate, said centering hub and said gear.

2. The apparatus of claim 1 wherein the inner end of said first half axle is rotatable with respect to said second half axle.

3. The apparatus of claim 2 wherein the inner end of said first half axle fits within the inner end of said second half axle, said second half axle containing a blind cylindrical cavity having an opening sufficiently large to permit the inner end of said first half axle to rotate freely within said cylindrical cavity.

4. The apparatus of claim 3 wherein said pinion gear has a hub which protrudes forward, away from the junction of the centerlines of said pinion gear and said ring gear.

5. The apparatus of claim 4 wherein said means for rotatably supporting said pinion gear and said first and second half axles comprises a bulbous shaped housing having a front opening and coaxial bearing assembly for rotatably supporting said hub of said pinion gear, and first and second colinear side openings symmetrically disposed on either side of said housing, each of said side openings having a coaxial bearing assembly for rotatably supporting said first and second half axles, respectively.

6. The apparatus of claim 1 wherein the tooth patterns on said pinion gear and said ring gear are helical.

7. The apparatus of claim 1 further including means for slippably connecting the inner facing ends of said first and second half axles.

8. The apparatus of claim 7 wherein said means for slippably connecting the inner facing ends of said first and second half axles comprises a slip clutch driveable by either half axle.

9. The apparatus of claim 8 wherein said slip clutch comprises a plurality of annular-shaped driving clutch plates mounted within a cylindrical housing rigidly coupled to the inner end of said first half axle, and a plurality of annular shaped clutch friction plates sandwiched between pairs of said discs, said clutch friction plates being rigidly attached to the inner end of said second half axle.

10. The apparatus of claim 1 further including means for rigidly connecting the inner facing ends of said first and second half axles.

11. The apparatus of claim 10 wherein said means for rigidly connecting the inner ends of said first and second half axles comprises:
   (a) an extension of the inner end of said first half axle beyond the inner face of said beveled gear, said extension having a plurality of longitudinally disposed, external splines, and,
   (b) a blind cylindrical cavity in the inner end of said second half axle, said cavity having a plurality of internal splines matching external splines on said extension of the inner end of said first half axle, whereby said extension may be inserted into said cavity, but not rotated with respect to said cavity.

12. The apparatus of claim 1 wherein said means for securing said centering hub, said gear, said backing plate and said axle together is further defined as locking means exerting a downward force on the inner transverse face of said centering hub.

13. The apparatus of claim 12 where said ring gear is secured in a fixed longitudinal position relative to said backing plate by means of bolts passing longitudinally through said ring gear and said backing plate.

14. The apparatus of claim 12 wherein said centering hub is further defined as having an annular flange on a first, inner transverse surface thereof, said annular flange being of larger diameter than the cylindrical surface of said centering hub provided with said longitudinally disposed external splines, whereby said downward force exerted by said locking means causes said annular flange to exert a compressive retaining force on the inner transverse face of said ring gear, thereby obviating the necessity for separate means for securing said ring gear in a fixed longitudinal position.

15. The apparatus of claim 1 wherein said means for rotatably supporting said ring gear comprises in combination a housing having an annular shaped opening therewithin for rotatably supporting said backing plate, a first set of tapered roller bearings, rollably positioned between a first inner annular surface of said housing and a first outer annular surface of said backing plate, and a second set of needle bearings rollably positioned between a second and inner annular surface of said housing and a second outer annular surface of said backing plate.

* * * * *